United States Patent [19]
Miller

[11] Patent Number: 5,938,818
[45] Date of Patent: Aug. 17, 1999

[54] ADVANCED HYBRID PARTICULATE COLLECTOR AND METHOD OF OPERATION

[75] Inventor: Stanley J. Miller, Grand Forks, N. Dak.

[73] Assignee: Energy & Environmental Research Center Foundation, Grand Forks, N. Dak.

[21] Appl. No.: 08/918,496

[22] Filed: Aug. 22, 1997

[51] Int. Cl.$^6$ ........................................ B03C 3/155
[52] U.S. Cl. .................. 95/63; 55/302; 55/341.1; 95/68; 95/76; 95/78; 95/280; 96/32; 96/55; 96/66
[58] Field of Search ................... 95/63, 68, 76, 95/69, 70, 78, 279, 280; 96/32, 55, 57, 66; 55/302, 341.1, 372

[56] References Cited

U.S. PATENT DOCUMENTS

| | | |
|---|---|---|
| 4,147,522 | 4/1979 | Gonas et al. ............................. 95/68 |
| 4,357,151 | 11/1982 | Hilfritch et al. ...................... 55/302 X |
| 4,904,283 | 2/1990 | Hovis et al. .............................. 55/131 |
| 5,024,681 | 6/1991 | Chang .................................. 110/217 X |
| 5,034,030 | 7/1991 | Miller et al. ............................... 55/96 |
| 5,158,580 | 10/1992 | Chang .................................. 55/124 X |
| 5,217,511 | 6/1993 | Plaks et al. ......................... 55/341.1 X |

*Primary Examiner*—Richard L. Chiesa
*Attorney, Agent, or Firm*—Zarley, McKee, Thomte, Voorhees & Sease

[57] ABSTRACT

A device and method for controlling particulate air pollutants of the present invention combines filtration and electrostatic collection devices. The invention includes a chamber housing a plurality of rows of filter elements. Between each row of filter elements is a grounded plate. Between the grounded plates and the filter elements are electrode grids for creating electrostatic precipitation zones between each row of filter elements. In this way, when the filter elements are cleaned by pulsing air in a reverse direction, the dust removed from the bags will collect in the electrostatic precipitation zones rather than on adjacent filter elements.

54 Claims, 12 Drawing Sheets

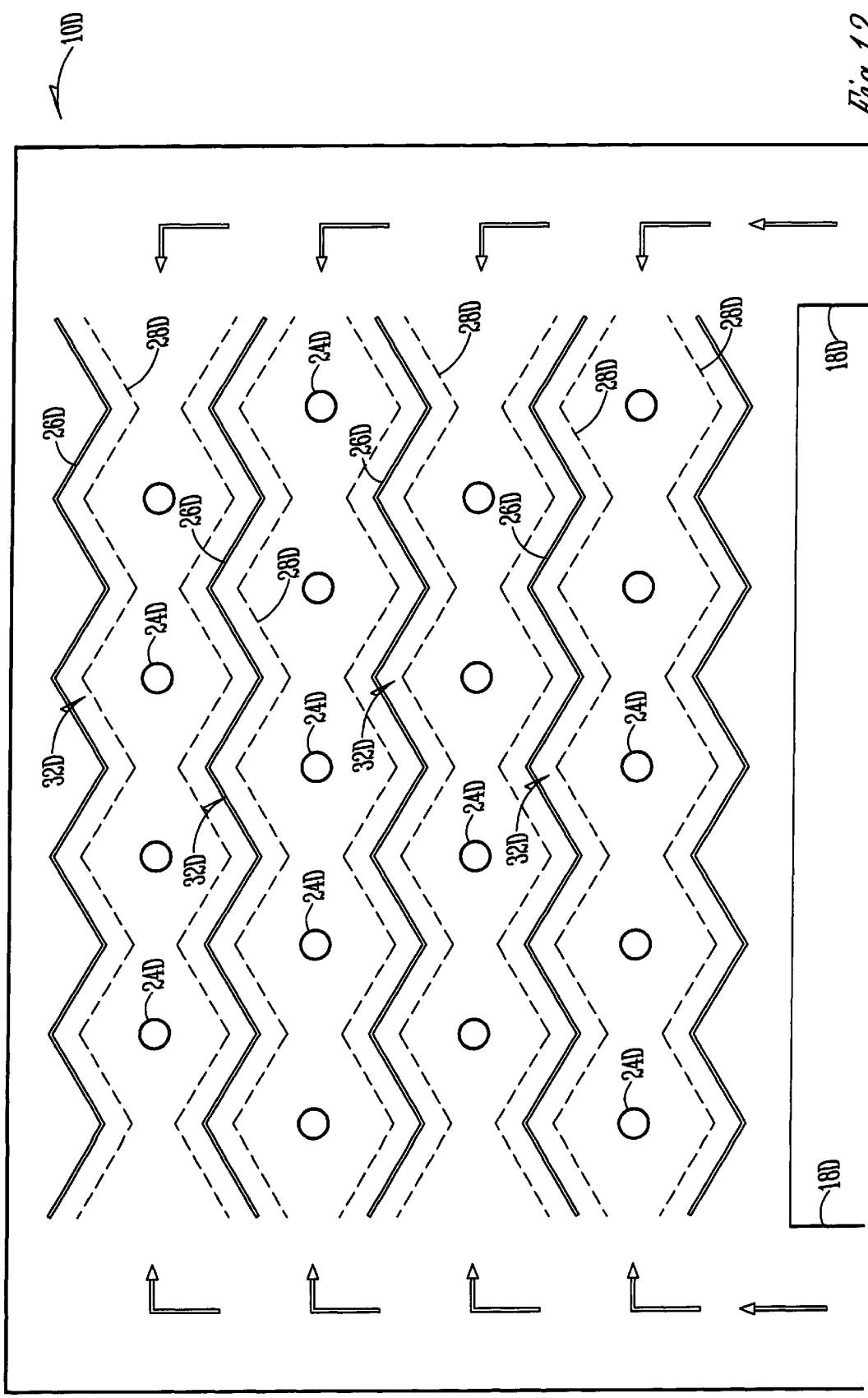

ADVANCED HYBRID PARTICULATE COLLECTOR AND METHOD OF OPERATION

The invention was developed with government support under U.S. Department of Energy Contract No. DE-AC22-95PC95258.

BACKGROUND OF THE INVENTION

1. Field Of The Invention

The present invention relates to the treatment of air pollution. Specifically, though not exclusively, the present invention relates to an apparatus and method to control particulate air pollutants.

2. Problems In The Art

In facilities such as power plants or factories, the facilities may produce particulate air pollutants which may consist of solid material entrained in a gaseous medium, liquid particles, fine fume-type particles, various types of smoke, nuisance dust, or any type of suspended solid material which is not easily separated from the gaseous medium by gravitational force. Similarly, in industries such as food industries, pharmaceutical industries, or chemical industries may produce very fine powders which must by collected. Such dust may originate from a variety of sources including the combustion or thermal processing of fuels or waste materials, chemical processing, food processing, cement kilns, or powder handling, for example.

One prior art method of reducing the particulate air pollutants involves the use of a conventional pulse-jet baghouse. A typical pulse-jet baghouse includes a number of individual bags or filtration tubes which are four to six inches in diameter, eight to twenty feet long, and are mounted within and suspended from a tube sheet. The particulate dust is collected on the outside surfaces of the bags while the flue gas passes through the bag fabric to the inside, where it exits through the top of the bags into a clean air plenum and subsequently out the stack. Cages are installed inside the bags to prevent them from collapsing during the normal filtration process. To clean the bags, air nozzles are installed above each bag. By applying a quick burst of high pressure air directed inside the bags, the bags are cleaned. This burst of air causes a rapid expansion of 31 the bag and momentarily reverses the direction of gas flow through the bag, which helps to clean the dust off the bags. In a typical prior art baghouse, the bags are oriented in a rectangular array spaced a few inches apart. The bags are usually cleaned with the burst of air one row at a time in sequence, with approximately fifteen bags per row. As a result of the small bag spacing and forward filtration through the two rows of bags adjacent to the row being cleaned, much of the dust that is removed from one row of bags is simply recollected on the adjacent rows of bags. As a result, only the very large agglomerates of dust reach the hopper after supplying the burst of air through the bags. This phenomenon of redisbursion and collection of dust after bag cleaning is a major obstacle to operating prior art baghouses at higher filtration velocities, also known as air-to-cloth (A/C) ratio.

One prior art method of controlling particulate air pollutants is disclosed in U.S. Pat. No. 4,904,283 issued to Hovis et al. on Feb. 27, 1990. This prior art method integrates filtration and electrostatic precipitation in one step. A high voltage electrode is installed in the center of the filter bags, with the grounded electrodes woven into the bags. One major problem with this method is that there is no effective way of transferring the collected dust from the bags to the hopper without reentrainment and recollection.

Another prior art method of controlling particulate air pollutants is disclosed in U.S. Pat. No. 5,217,511 issued to Plaks et al. on Jun. 8, 1993. This method involves the placement of high voltage electrodes between pulse-jet-cleaned bags. Again, a major disadvantage of this method is that there is no effective way to transfer the dust from the bags to the hopper without reentrainment and recollection.

Another prior art method of controlling particulate air pollutants is disclosed in U.S. Pat. Nos. 5,024,681 and 5,158,580 issued to Chang on Jun. 18, 1991 and Oct. 27, 1992. This prior art method uses a high ratio fabric filter installed downstream from an electrostatic precipitator and includes the option of installing a separate precharger section between the precipitator and fabric filter. Again, there is no effective way for removing the dust from the bags without reentrainment and recollection.

Another prior art method of controlling particulate air pollutants is disclosed in U.S. Pat. No. 4,357,151 issued to Helfritch et al. on Nov. 2, 1982. This prior art method discloses a particulate collection method which uses electrostatic collection and filtration combined into the same housing in which high voltage electrodes are spaced between cylindrical perforated grounded surfaces as a filter outer shell and a pleated filter medium inside the cylindrical shell. This method has similar disadvantages.

Therefore, a need can be seen for an apparatus and method for effectively and efficiently controlling particulate air pollutants.

FEATURES OF THE INVENTION

A general feature of the present invention is the provision of a method and apparatus for controlling particulate air pollutants which overcomes problems found in the prior art.

A further feature of the present invention is the provision of a method and apparatus for controlling particulate air pollutants using the combination of a filter element and an electrostatic precipitation zone which overcomes problems found in the prior art.

A further feature of the present invention is the provision of a method and apparatus for controlling particulate air pollutants in which a high voltage electrode is disposed between a filter element and a grounded plate.

A further feature of the present invention is the provision of a method and apparatus for controlling particulate air pollutants which includes a method for removing dust from the filter elements in an effective manner.

Further features, objects and advantages of the present invention include:

A method and apparatus for controlling particulate air pollutants in which a plurality of filter elements are arranged in rows with a grounded plate located between each row and an electrode grid located between each grounded plate and row of filter elements.

A method and apparatus for controlling particulate air pollutants in which gasses are introduced into a chamber at each end of the plurality of rows of filter elements.

A method and apparatus for controlling particulate air pollutants in which gasses are introduced into a chamber from below the filter elements.

A method and apparatus for controlling particulate air pollutants which includes a hopper disposed below the electrostatic precipitation zone for collecting dust removed from the grounded plate.

A method and apparatus for controlling particulate air pollutants which includes a plurality of air nozzles disposed above each filter element to clean the elements by directing a burst of air into the filter element.

A method and apparatus for controlling particulate air pollutants which uses a plurality of pulses of air to clean dust from the filter elements.

A method and apparatus for controlling particulate air pollutants in which the electrostatic precipitation zone extends horizontally past the filter elements.

A method and apparatus for controlling particulate air pollutants in which the electrostatic precipitation zone extends vertically past the filter elements.

A method and apparatus for controlling particulate air pollutants which includes rows of filter elements arranged in a zigzag pattern.

A method and apparatus for controlling particulate air pollutants which uses filter elements having a fabric comprised of Gore-Tex® membrane filter media.

A method and apparatus for controlling particulate air pollutants which includes a number of baffles located at the ends of rows of filter elements to direct the flow of dirty air to the electrostatic precipitation zones.

These as well as other features, objects and advantages of the present invention will become apparent from the following specification and claims.

SUMMARY OF THE INVENTION

The apparatus and method of the present invention is used to control particulate air pollutants in a gaseous medium. The invention is comprised of a chamber including inlet and outlet ports for allowing the flow of gasses through the chamber, a plurality of filter elements disposed within the chamber, one or more grounded plates disposed within the chamber, and one or more high voltage electrodes disposed between the filter elements and the grounded plate to form an electrostatic precipitation zone. The invention may optionally include a method for effectively and efficiently removing dust from the filter elements by propelling dust from the filter elements toward the electrostatic precipitation zone.

BRIEF DESCRIPTION OF THE DRAWINGS

FIG. 12 is a top schematic view of an alternative embodiment of the present invention.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

Figure 1:
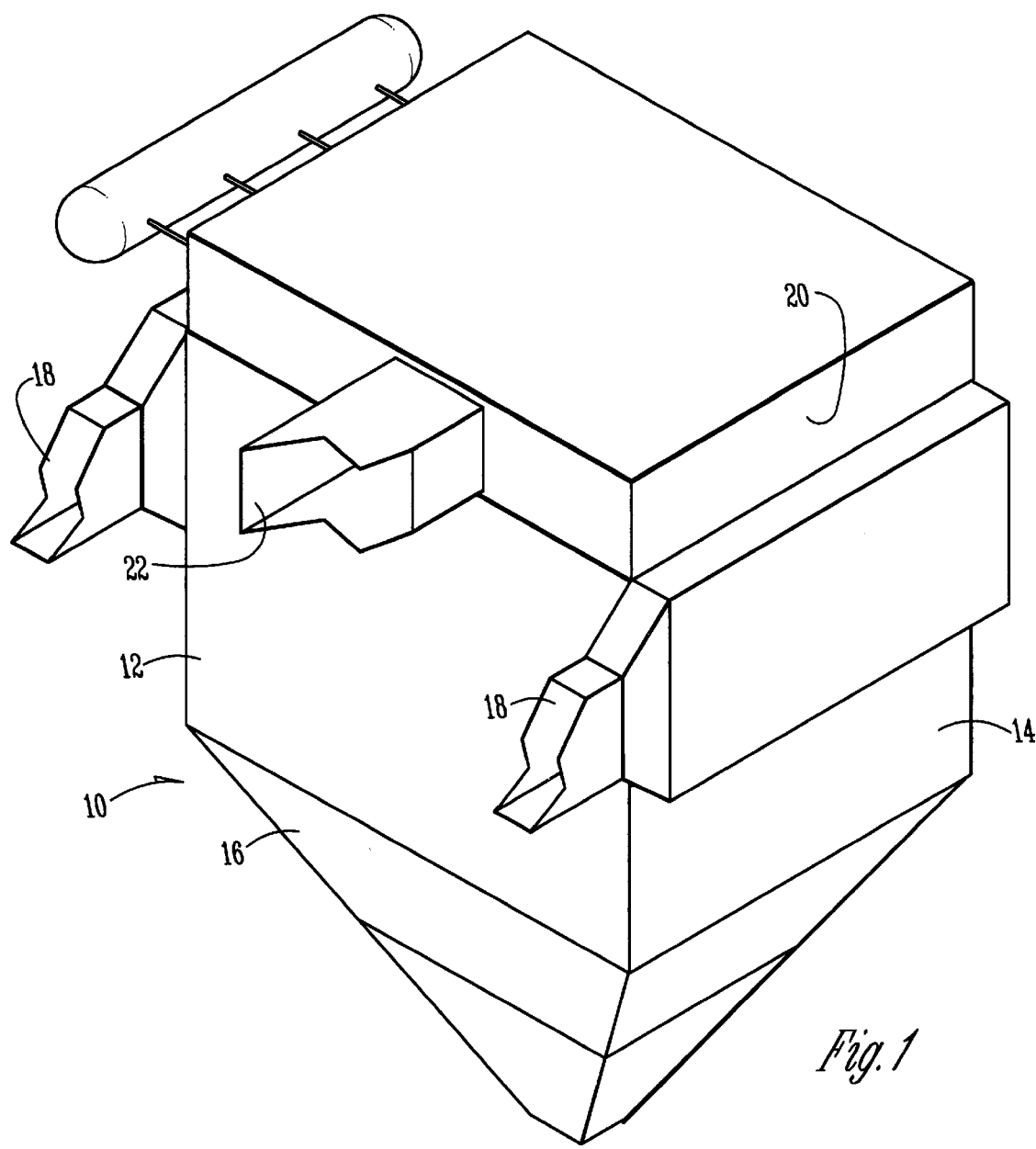
FIG. 1 is a perspective view of the preferred embodiment of the present invention.

FIG. 1 shows an advanced hybrid particulate collector (AHPC) of the present invention. An AHPC vessel 10 includes a pair of side walls 12 and a pair of end walls 14 which together form a chamber. Disposed below the side walls 12 and end walls 14 is a hopper 16 which, as is described below, collects particulates. Located on each end wall 14 is an inlet duct 18 which serves as a flue gas inlet or dirty air inlet for the AHPC vessel 10. Located on the upper portion of the AHPC vessel 10 is a clean gas plenum 20 which is connected to outlet ducting 22 which serves as a flue gas outlet. In operation, polluted flue gas is introduced into the AHPC vessel 10 through the inlet ducts 18 and cleaned gas is removed via the outlet ducting 22. The particulate air pollutants removed from the flue gas are eventually collected in the hopper 16.

Figure 2:
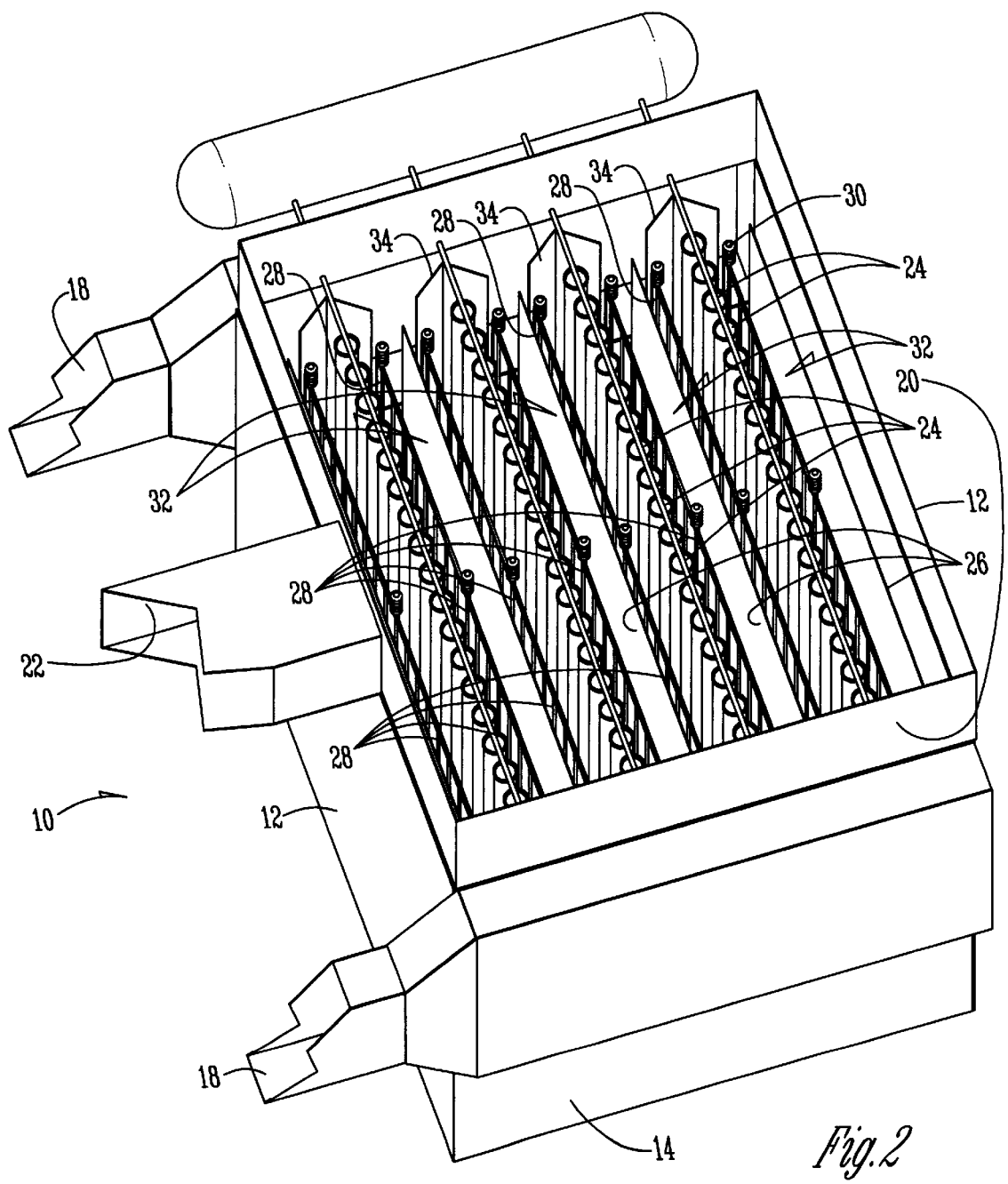
FIG. 2 is a perspective view of the embodiment shown in FIG. 1 with the top and tube sheet removed to show the interior of the advanced hybrid particulate collector (AHPC) Vessel.

FIG. 2 is a perspective view of the AHPC vessel 10 with the top and bottom surfaces of the clean gas plenum 20 removed to reveal the inside of the chamber. Similarly, FIG. 3 shows the AHPC vessel 10 with the clean gas plenum 20, one of the inlet ducts 18, the outlet duct 22, and one of the side and end walls 12 and 14 removed.

Figure 3:
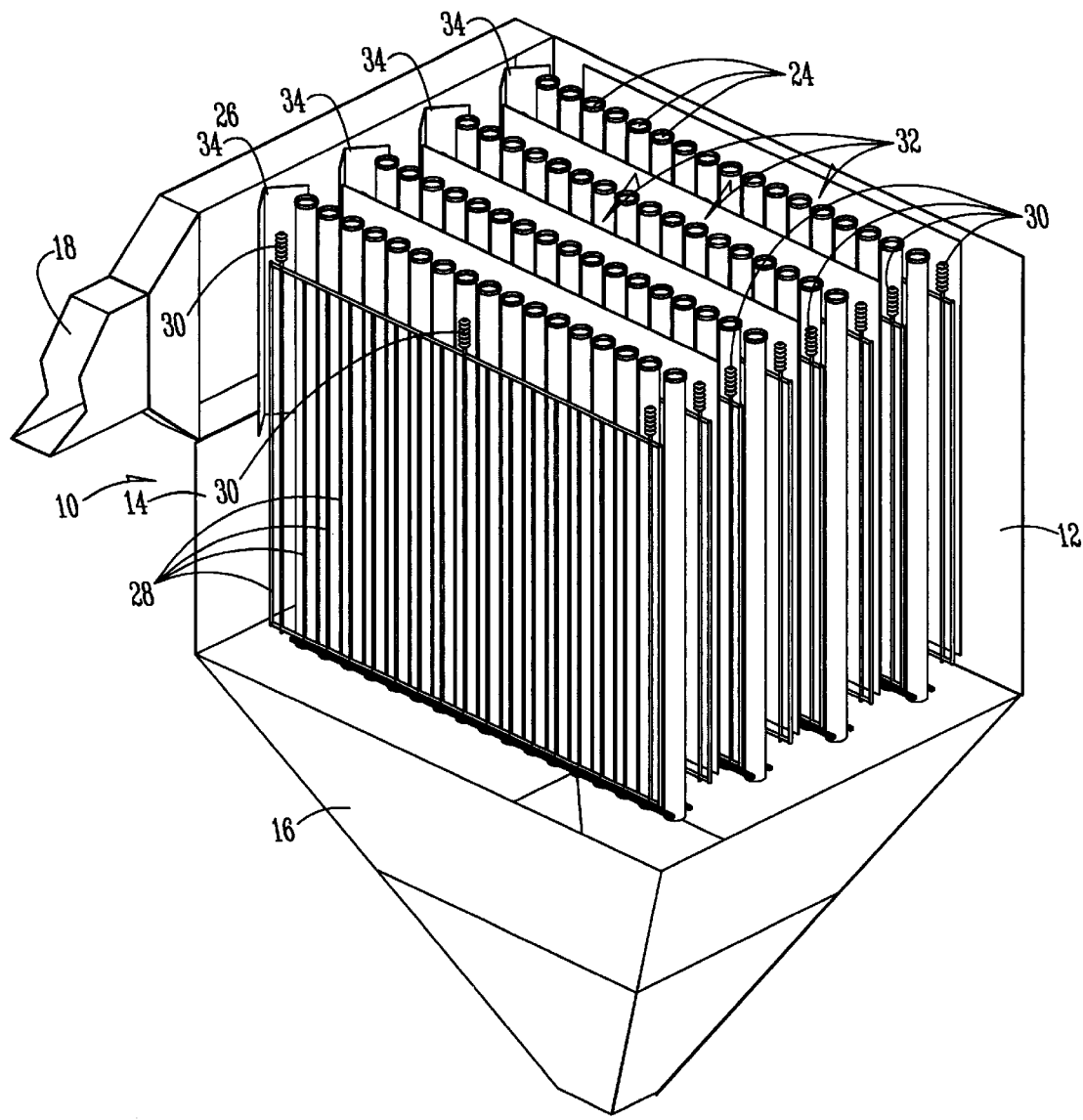
FIG. 3 is a perspective view of the embodiment shown in FIG. 1 with the top and two sides removed.

As shown in FIGS. 2 and 3, a plurality of filter bags 24 are arranged in rows within the AHPC vessel 10. The filter bags 24 are preferably comprised of elongated cylindrical bags disposed around a wire cage (not shown). The upper end of the filter bags 24 are open and are in communication with the clean gas plenum 20 (via a tube sheet). The bags 24 are sealed at their lower ends. The bottom end of the filter bags 24 are closed. When gas is introduced into the AHPC vessel 10 via the inlet ducting 18, the gas flows through the bags 24 into the clean air plenum 20. In this way, the gas introduced into the AHPC vessel 10 must flow through the filter bags 24 before leaving the AHPC vessel 10. In the preferred embodiment, the flow of gases through the AHPC vessel 10 flows at a filtration velocity in the range of 8 to 24 feet per minute.

Between each row of filter bags 24 is a grounded plate 26. Between each row of filter bags 24 and each adjacent grounded plate 26 is an electrode grid 28. Each of the electrode grids 28 is insulated from the AHPC vessel 10 by the insulators 30. Each electrode grid 28, along with its adjacent grounded plate 26, form an electrostatic precipitation (ESP) zone 32. An ESP zone 32 is therefore formed on each side of each row of filter bags 24. In this way, as is described below, when gas containing particulates passes through the ESP zones 32, the particulates are collected on the grounded plates 26. The bags 24, electrode grids 28, and grounded plates 26 are preferably spaced apart such that the electrode grids 28 are closer to the grounded plates 26 than they are to the bags 24. In one embodiment, the distance from each bag 24 to the adjacent electrode grid 28 is in the range of 51% to 80% of the total distance from the bag 24 to the adjacent grounded plate 26. Also shown in FIGS. 2 and 3 are a plurality of baffles 34 which serve to direct the gas from the inlet ducts 18 into the ESP zones 32.

Figure 5:
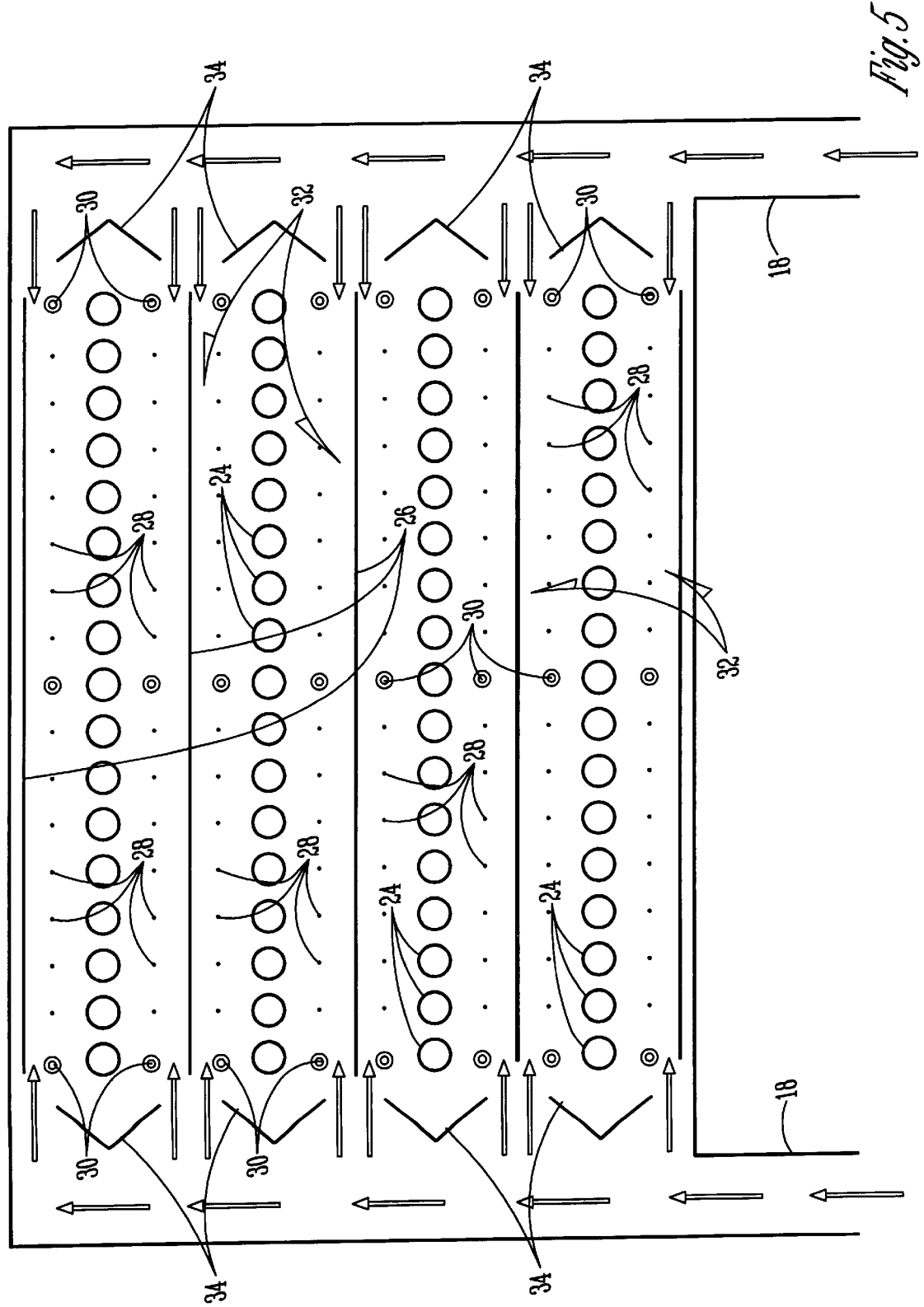
FIG. 5 is a top schematic view of the present invention.

FIG. 5 is a top schematic view of the AHPC vessel 10 illustrating the layout of the filter bags 24, the ESP zones 32, and the baffling. The arrows shown in FIG. 5 illustrate the direction of the flow of gas through the AHPC vessel 10. As shown, the gas is introduced into the chamber where it is directed into the ESP zones 32 by the baffles 34. The gas then flows through the filter bags 24, into the clean gas plenum 20, and out through the outlet ducting 22 (described below).

Figure 6:
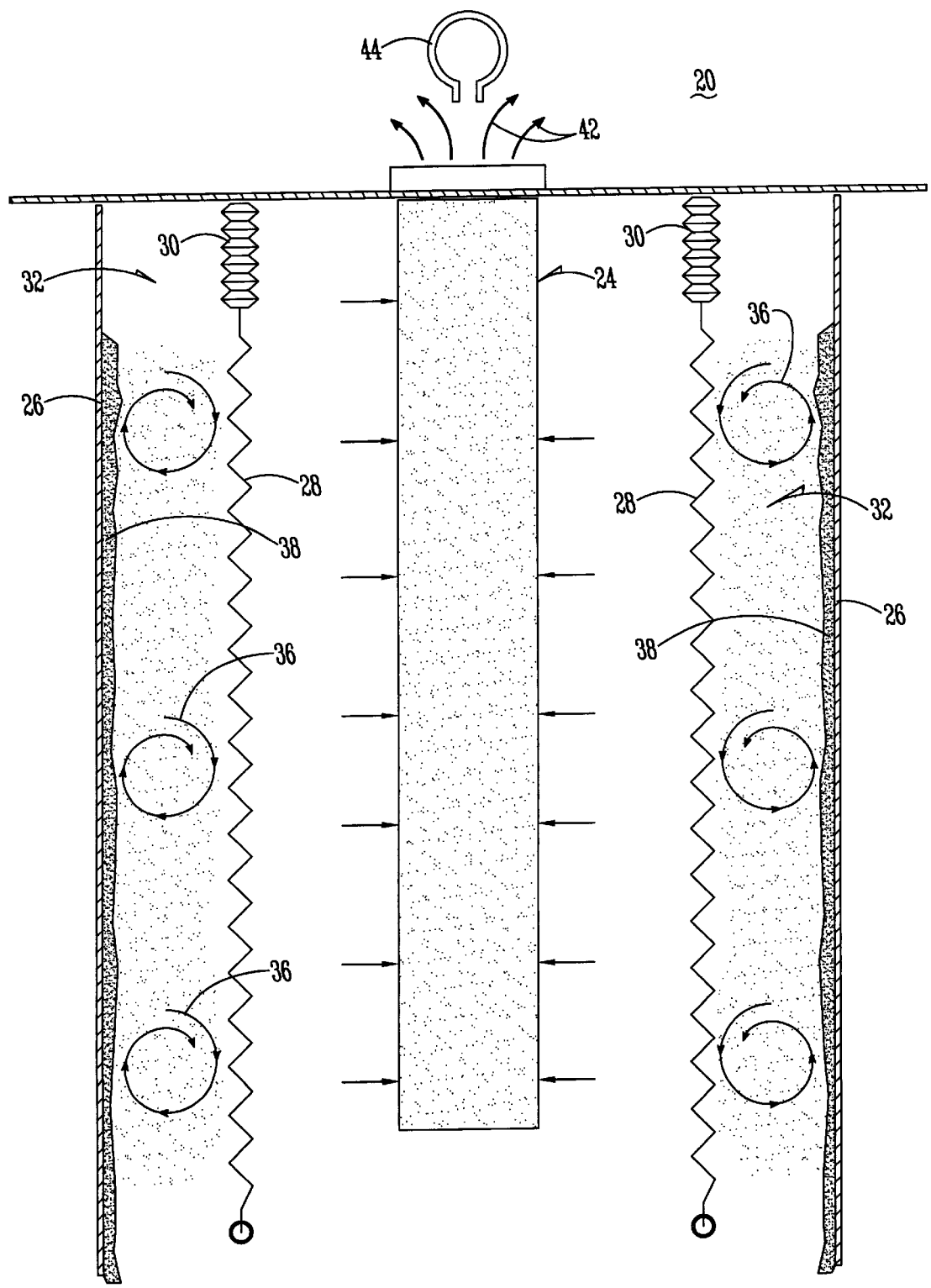
FIGS. 6–8 are sectional views illustrating the operation of the present invention.
Figure 7:
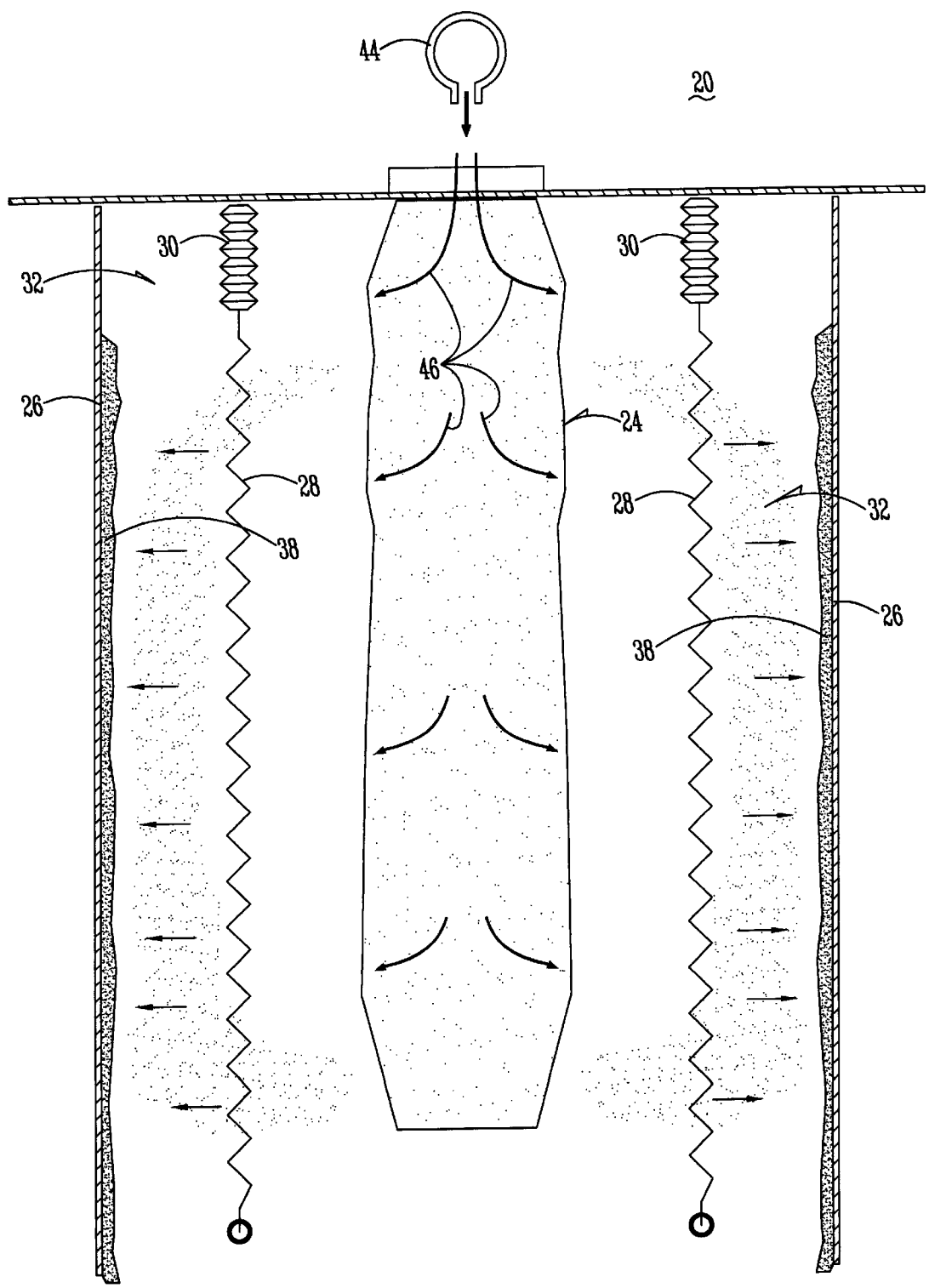
Figure 8:
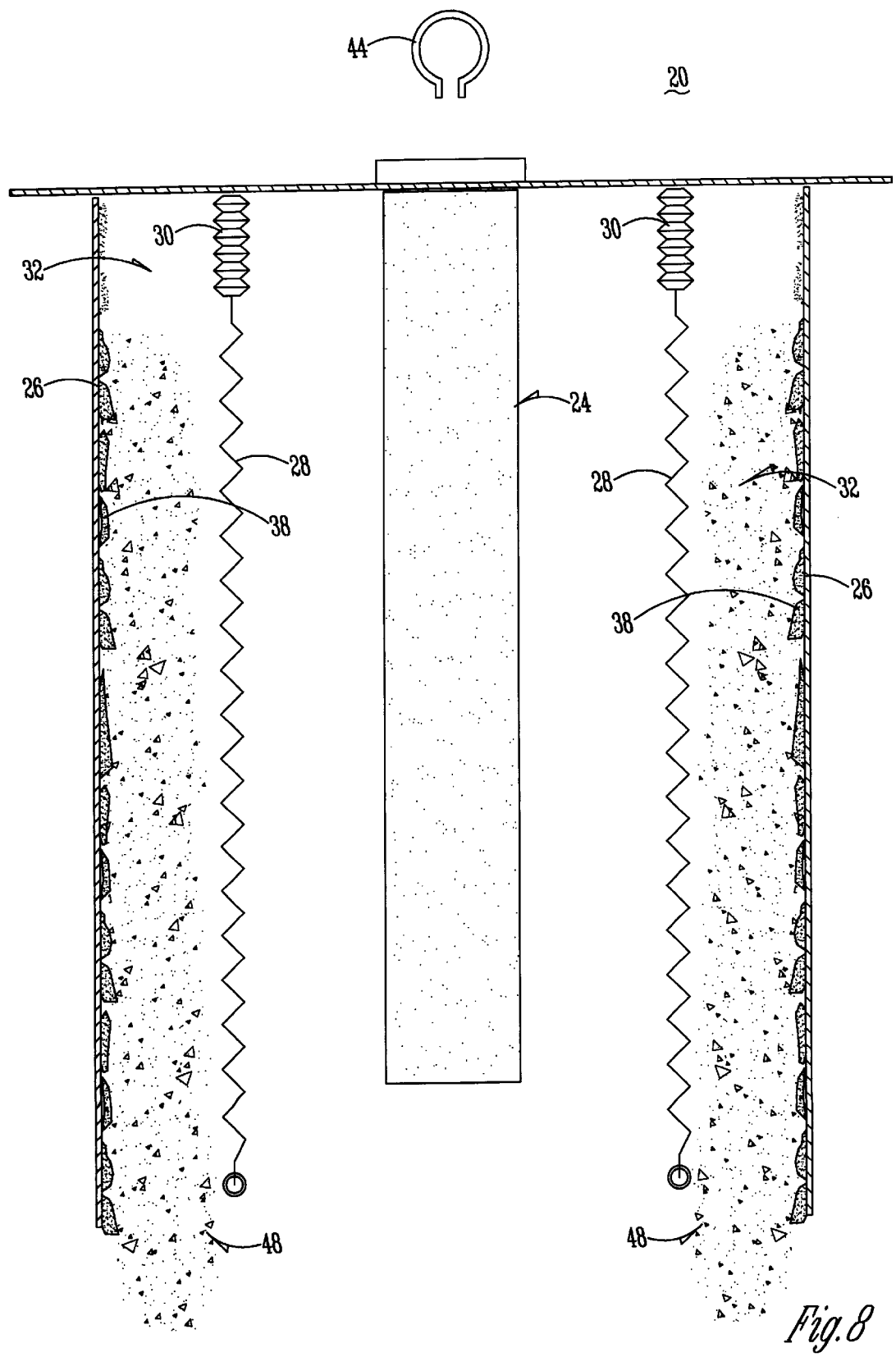

FIGS. 6–8 are enlarged sectional views of one row of filter bags. FIGS. 6–8 illustrate the operation of the present invention in detail.

To completely understand the operation of the present invention, it is helpful to look at the housing of the AHPC vessel 10 as being divided into five zones which are in continuous fluid contact. Zone 1 is comprised of the inlet ducting and baffling whose purpose is introducing the dirty gas to the collection zones. Zone 2 is the electrostatic collection area and consists of the plurality of high voltage electrodes, or electrode grids 28, and grounded collection plates 26. Zone 3 is the filtration area and consists of the plurality of filter elements, or filter bags 24. Zone 4 is the dust collection hopper 16 located below Zones 2 and 3. Zone 5 is the clean plenum area above Zones 2 and 3 and includes bag cleaning blowback pipes and nozzles 44, a plenum area to access the bags 24, and outlet ducting 22 to pass the cleaned gas to the fan and discharge stack (not shown).

FIG. 6 shows the normal particulate collection mode of the present invention. As was mentioned above, dirty gas is introduced into the AHPC vessel 10 by the inlet ducting 18 (Zone 1). The air baffles 34 cause the gas to flow into the ESP zones 32, which are located between the electrode grids 28 and the grounded plates 26 (FIG. 5). The baffles 34 cause the gas to flow in a turbulent manner as is illustrated by the arrows 36. As a result of the electric field produced by the electrode grid 28 and the grounded plates 26, the particulates in the ESP zone immediately become charged and migrate toward the grounded plate 26 at a velocity (migration velocity) dependent upon the particle charge and the electric field strength. Since all of the gas flow must eventually pass from Zone 2 into Zone 3 and through the bags 24, there is a velocity component perpendicular to the plates that passes the wires, or electrode grid 28. Since migration velocity of particles moving toward the plates 26 will be greater than the gas velocity component moving toward the bags 24, most of the particles will collect on the plates 26 rather than be carried past the electrode grid 28 to the bags 24. Under ideal laminar flow conditions, only particles with migration velocities smaller than the gas velocity toward the bags 24 would reach the bags 24 during normal filtration. However, because of some flow maldistribution and the presence of turbulent flow, a small fraction of the dust (less than 10%) might reach the bags 24 during normal collection operation. However, collection of the particles that do reach the filtration surface of the bags 24 is enhanced as a result of the particle charging. Charged particles are more readily collected because there is an additional coulomb force to drive the particles to a grounded or neutral surface. In addition, a dust cake formed from the charged particles will become porous, which produces a lower pressure drop. Ultra high fine-particle collection is achieved by removing over 90% of the dust before it reaches the fabric, precharging the particles, and using appropriate membrane and fabric to collect particles that do not reach the filtration surface with a high efficiency. After flowing through the bags 24, the gas flows upward into the clean air plenum 20 as is illustrated by the arrows 42. As a result, the gas entering the clean air plenum 20 is very clean. The clean gas is then sent to the stack via the outlet ducting 22 (FIG. 1).

FIG. 7 illustrates the bag cleaning process. Since the dust accumulates on the grounded plates 26 and filter bags 24, it must be periodically removed and transferred from Zones 2 and 3 to the hopper 16, or Zone 4. Located above each filter bag 24 is a pulse nozzle 44 which is capable of directing a pulse of air down through the filter bags 24. One row of the bags 24 at a time is cleaned with a reverse pulse of pressurized air or gas from the pulse nozzles 44. The pulse has sufficient energy to dislodge most of the dust from the bags 24. Larger agglomerates fall to the hopper 16 and are transferred directly from Zone 3 to Zone 4. However, much of the dust is reentrained into particles too small to fall directly to the hopper. While these are small particles, they were agglomerated into much larger particles than are originally collected on the bags. As discussed above, in conventional baghouses these particles would immediately recollect on the bags 24. With the present invention, the bags 24 are pulsed with sufficient energy and volume to propel the reentrained dust past the high voltage wires and back into Zone 2, the ESP zone, where they immediately become charged and are trapped on the plates 26. Since these reentrained particles are much larger than those originally collected on the bags, they are trapped in the ESP zone much more easily than the original fine particles.

To improve the cleaning process, the present invention may utilize a two-tiered cleaning pulse. A first, high-pressure short-duration pulse is followed by a second, lower-pressure longer duration pulse. Preferably, the first pulse is in the range of 15 to 150 psig, with a duration in the range of 0.01 to 0.5 seconds. The second pulse is in the range of 1 to 15 psig, with a duration in the range of 0.5 to 10 seconds. Conversely, the first pulse is in the range of 1 to 15 psig, with a duration in the range of 0.5 to 10 seconds. The second pulse then is in the range of 15 to 150 psig, with a duration in the range of 0.01 to 0.5 seconds. Of course, the present invention may use a single pulse, or more than two pulses.

Preferably, the plates 26 are cleaned near the end of the bag cleaning process with the electric field shut off for 0.1 to 8 seconds to release the dust from the plates 26. In another embodiment, the polarity of the electric field is reversed during the bag cleaning and plate rapping steps.

The alternative rows of bags 24, electrode grids 28, and plates 26 act as an "electronic curtain" to prevent the reentrained dust from being collected on the same bags 24. The plates 26 prevent the dust from being recollected on adjacent rows of bags 24.

Periodically, the dust layers 38 must be cleaned from the grounded plates 26. FIG. 8 illustrates a plate rapping process which removes the dust and particulates from the grounded plates 26, or transfers the dust from Zone 2 to the hopper 16, or Zone 4. With the high voltage disconnected from the electrode grid 28, the grounded grids 26 are rapped or vibrated to dislodge large agglomerates which then fall in the hopper 16. A fraction of the dust is reentrained as particles too small to reach the hopper 16. Most of the reentrained particles are recollected on the plates 26. Any remaining fine dust, reentrained as a result of rapping, that penetrates the ESP Zone 32 will be collected at an ultrahigh collection efficiency by the filter bags 24. Plate cleaning may also be accomplished without disconnecting the high voltage.

Figure 9:
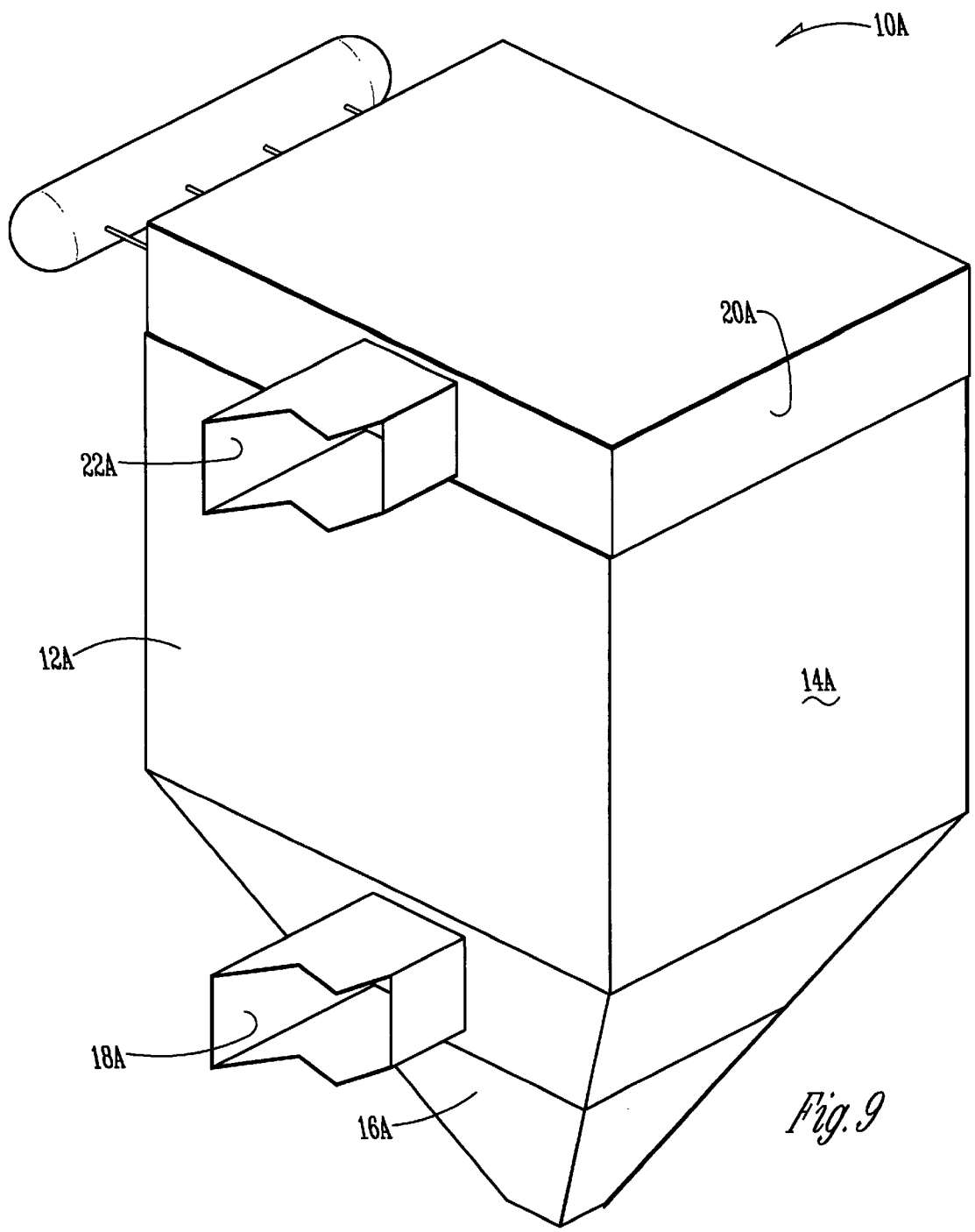
FIG. 9 is a perspective view of an alternative embodiment of the present invention.

FIG. 9 shows an alternative embodiment of the present invention. FIG. 9 shows an AHPC vessel 10A which is substantially the same as the AHPC vessel 10 shown in FIG. 1 except for the differences illustrated below. In the AHPC vessel 10A, the dirty flue gas is introduced from below the rows of filter bags 24 rather than from the sides. As shown in FIG. 9, a flue gas inlet ducting 18A is located below the chamber of the AHPC vessel 10A so that the dirty flue gas is introduced below the rows of filter bags 24 and ESP zones 32. The flue gas must pass upward into the channels defined by adjacent grounded plates in order to reach the filter bags 24. The outlet ducting 22A and clean gas plenum 20A are the same as that shown in FIG. 1.

Figure 4:
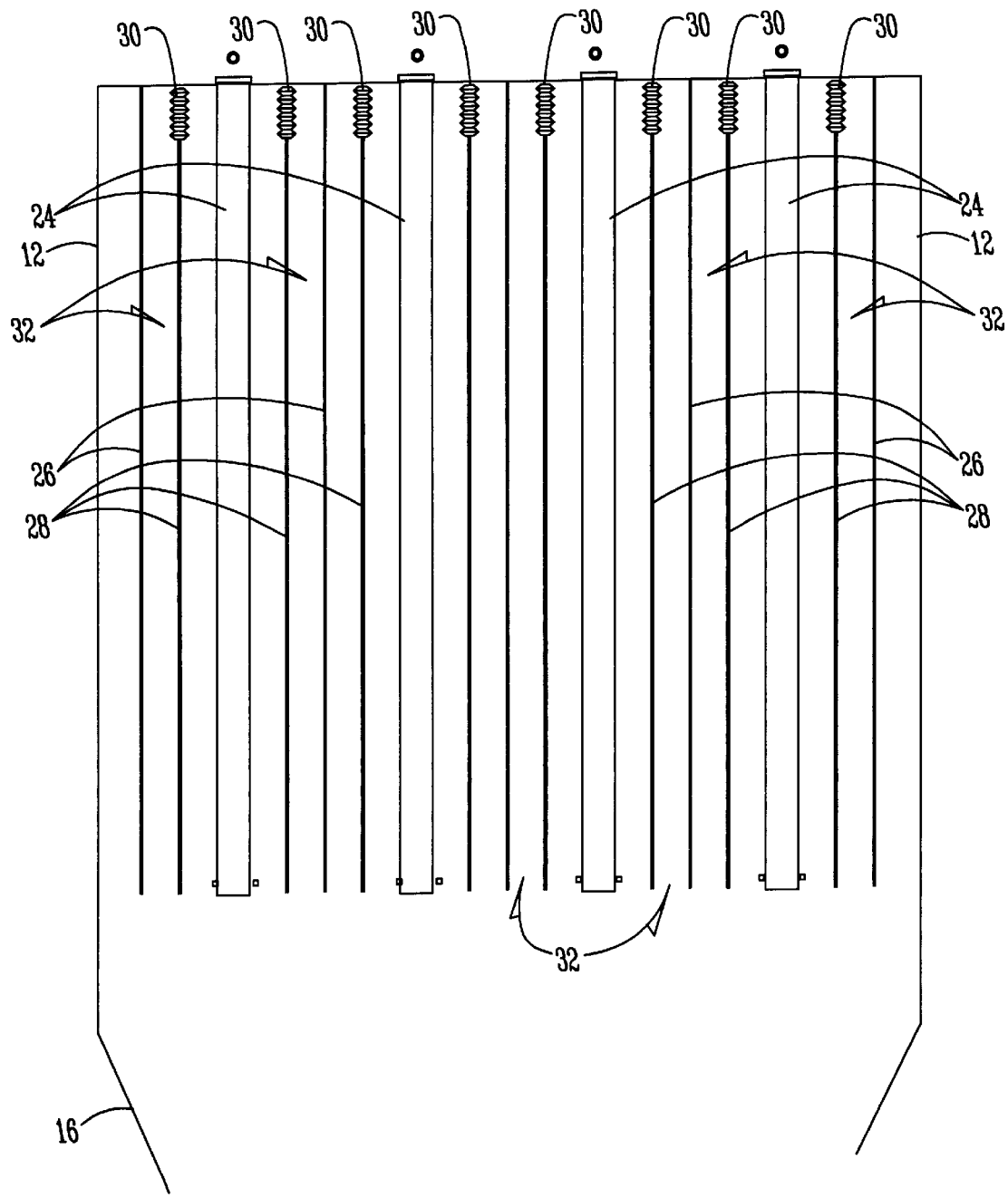
FIG. 4 is a sectional view of the AHPC Vessel shown in FIG. 1.
Figure 10:
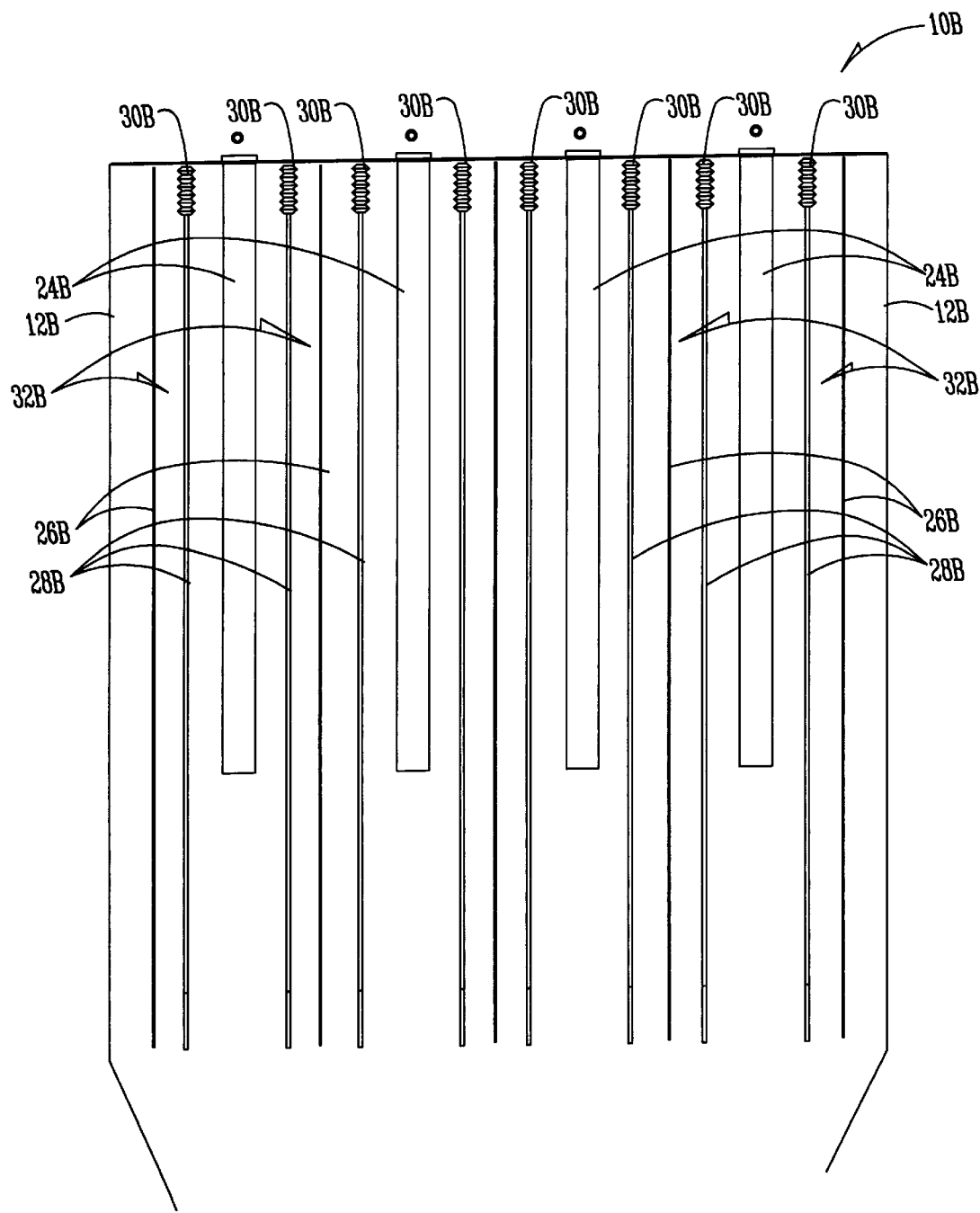
FIG. 10 is a sectional view of an alternative embodiment of the present invention.

FIG. 10 shows another alternative form of the present invention. FIG. 10 shows an AHPC vessel 10B which is substantially the same as the AHPC vessel 10 as shown in FIG. 1 except that the ESP zones 32B extend downward farther than the bags 24B. The purpose of this alternative embodiment is to capture a larger portion of the dust before it reaches the filter bags 24. This difference is best illustrated by comparing FIG. 10 with FIG. 4.

Figure 11:
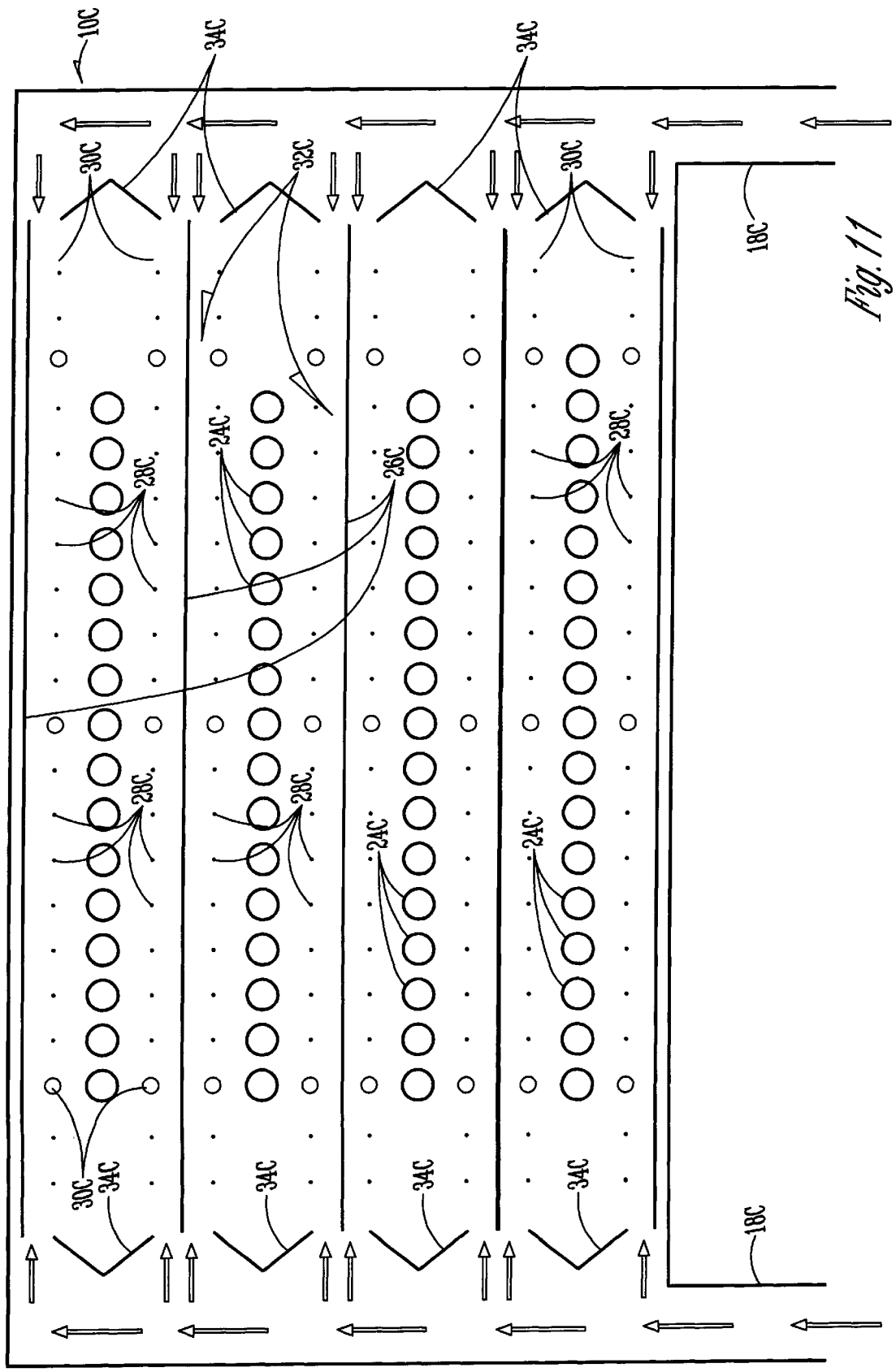
FIG. 11 is a top schematic view of an alternative embodiment of the present invention.

FIG. 11 shows another alternative embodiment of the present invention. FIG. 11 is a diagram similar to FIG. 5 except that the ESP zones 32C extend horizontally beyond the rows of filter bags 24C. In this way, the gas introduced by the inlet ducting 18C must pass through extend ESP zones 32 before reaching the filter elements or filter bags 24C. With this embodiment, the flue gas must pass through an extended electrostatic zone 32B before it reaches the bag area. The purpose of this embodiment is to ensure the capture of a larger portion of the dust before it reaches the filter bags 24. A difference in this embodiment is illustrated best by comparing FIG. 11 with FIG. 5.

FIG. 12 is another embodiment of the present invention. The embodiment shown in FIG. 12 is substantially the same as the embodiment shown in FIG. 5 except that the ESP zones 32D form a zigzag pattern. As shown, the grounded plates 26D and electrode grids 28D comprise a plurality of straight segments arranged as shown. Alternatively, the grounded plates 26D and/or electrode grids 28D could be curved or form patterns other than the zigzag pattern show.

For the best results, the filter bags 24 of the present invention should be comprised of a sophisticated fabric which can achieve ultra high collection efficiency and can also endue frequent high energy pulsing. In addition, the selected fabric should be reliable under the most severe chemical environment likely to be encountered (for example, high $SO_3$). The filter bags 24 are preferably comprised of Gore-Tex® membrane on Gore-Tex® felt consisting of a microporous expanded polytetrafluoroethylene (PTFE) membrane laminated to a felted or fabric backing material such as that manufactured by W.L. Gore and Associates, Inc. Another alternative filter element comprises the use of a filter cartridge which could be comprised of both paper or fabric. The preferred filter cartridge is comprised of a cartridge known as the Gore-Tex® light pulse filter cartridge manufactured by W.L. Gore and Associates, Inc. In addition, any other suitable paper or fabric filter type may be used. Another alternative filter element is a ceramic gas filter. One example of a suitable ceramic gas filter is manufactured by CeraMem Separations under the name CeraMem®.

Electrode grid 28 is preferably comprised of high voltage corona discharge electrodes, either in the form of wires or a rigid frame. Preferably, directional corona electrodes are used so that the corona is forced to the plate side of the electrode rather than to the backside. In addition, any other type of conventional electrode may be employed. In an alternative embodiment, the bags 24 can be protected by including a row of grounded wires located between the electrode grid 28 and the bags 24. However, typically, this extra row of grounded wires is not necessary, except under severe sparking conditions. Another optional embodiment involves the use of multiple vessels for use with large power plants, for example.

There is major synergism between the ESP and filtration modes of the present invention, each improving the operation of the other. The filter elements collect the excess ESP emissions during normal operation and during rapping, and the ESP collects the reentrained dust from the filter elements upon cleaning, which will greatly enhance the ability to control pressure drop and operate at high A/C ratios. The present invention results in a high collection efficiency and requires a much lower plate collection than with conventional ESP devices and much less filtration area than in conventional baghouses. In the preferred embodiment, the fabric is operated at an A/C ratio of 12 ft./min. The corresponding required plate area would be a specific collection area (SCA) of 72 square feet of collection are per thousand acfm. A baghouse operating at an A/C ratio of 2 ft./min. has the same collection area as an ESP with an SCA of 500. Therefore, the device of the present invention operating at an A/C ratio of 12 ft./min. would offer an 83% reduction in fabric area over a conventional baghouse operating at 2 ft./min. and an 86% reduction in plate area over a conventional ESP with an SCA of 500. The combined collection area in the present invention would be 69% lower than either the conventional baghouse or ESP.

The performance of the present invention may also be improved by injecting upstream of the baghouse a small but conditioning effective amount of ammonia gas ($NH_3$) and sulfur trioxide ($SO_3$) in sequence. When this is done, the pressure drop across the baghouse is less and the amount of particulate matter in the smoke stack emissions is reduced by significant amounts. This method is described in detail in U.S. Pat. No. 5,034,030 entitled "Process of Flue Gas Conditioning Applied to Fabric Filtration" issued to Miller et al. on Jul. 23, 1990 which is incorporated by reference herein.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of removing dust from filter elements in a filtration and electrostatic precipitation device having at least one filter element, at least one grounded surface, and at least one electrode surface forming an electrostatic precipitation zone, the method comprising the steps of:

arranging the at least one filter element, at least one grounded surface, and at least one electrode surface such that the electrode surface is disposed between and separated from the at least one filter element and the grounded surface;

propelling dust which has collected on the at least one filter element toward the electrostatic precipitation zone; and collecting the dust on the grounded surface.

2. The method of claim 1 wherein the step of propelling dust further comprising the step of pulsing air through the at least one filter element to propel the dust into the electrostatic precipitation zone where it collects on the grounded surface.

3. The method of claim 2 wherein the step of pulsing air further comprises the steps of providing a first pulse and a second pulse, wherein the first and second pulses have different durations and pressures.

4. The method of claim 3 wherein first pulse has a pressure higher than the pressure of the second pulse and a duration shorter than the duration of the second pulse.

5. The method of claim 4 wherein the first pulse has a pressure in the range of 15 to 150 psig and a duration in the range of 0.01 to 0.5 seconds, and wherein the second pulse has a pressure in the range of 1 to 15 psig and a duration in the range of 0.5 to 10 seconds.

6. The method of claim 4 wherein the second pulse has a pressure in the range of 15 to 150 psig and a duration in the range of 0.01 to 0.5 seconds, and wherein the first pulse has a pressure in the range of 1 to 15 psig and a duration in the range of 0.5 to 10 seconds.

7. The method of claim 1 further comprising the steps of:
providing a hopper disposed below the grounded surface; and
transferring the collected dust from the grounded surface to the hopper.

8. The method of claim 7 wherein the dust is transferred to the hopper by vibrating the grounded surface.

9. The method of claim 7 wherein the dust is transferred to the hopper by applying a mechanical impact to the grounded surface.

10. The method of claim 7 wherein the dust is transferred to the hopper while the dust is being propelled toward the electrostatic precipitation zone.

11. The method of claim 7 wherein any electric field in the electrostatic precipitation zone is turned off while the dust is transferred to the hopper.

12. The method of claim 11 wherein the electric field is turned off for a time period in the range of 0.1 to 8 seconds.

13. The method of claim 7 wherein the electrostatic precipitation device includes a gas inlet disposed above the hopper.

14. The method of claim 7 wherein the polarity of the electric field in the electrostatic precipitation zone is reversed while the dust is transferred to the hopper.

15. The method of claim 1 wherein the at least one filter element comprises a plurality of filter elements which are arranged in a plurality of rows with at least one of the grounded surfaces disposed between each row of filter elements and with at least one of the electrode surfaces disposed between each row of filter elements and each adjacent grounded surface.

16. The method of claim 15 wherein the at least one grounded surface is comprised of a plurality of grounded plates disposed generally parallel to each other, the method further comprising the steps of:
providing a hopper disposed below the grounded plates; and
using the plurality of grounded plates to channel the propelled dust downward toward the hopper.

17. The method of claim 15 further comprising the step of providing a plurality of second grounded surfaces disposed between each of the filter elements and its adjacent electrode.

18. The method of claim 15 wherein the electrode surfaces comprise directional high-voltage electrodes, the method further comprising the step of forming corona discharge points on the side of the electrode surfaces facing its adjacent grounded surface.

19. The method of claim 1 wherein the dust is partially agglomerated after being removed from the at least one filter element.

20. The method of claim 1 wherein the electrostatic precipitation zone forms an electronic curtain to trap dust in the electrostatic precipitation zone.

21. The method of claim 20 wherein the electronic curtain prevents the dust from recollecting on the at least one cleaned filter element.

22. An apparatus for the control of particulate air pollutants in a gaseous medium comprising:
a chamber having inlet and outlet ports for allowing the flow of gases through the chamber;
at least one filter element disposed within the chamber, the at least one filter element being in communication with the outlet port of the chamber;
at least one grounded plate disposed within the chamber; and
at least one high voltage electrode disposed between and separated from the at least one filter element and the at least one grounded plate to form an electrostatic precipitation zone between the high voltage electrode and the grounded plate.

23. The apparatus of claim 22 wherein the at least one filter element comprises a plurality of filter elements which are arranged in rows of filter elements.

24. The apparatus of claim 23 wherein the rows of filter elements are arranged in a zigzag pattern.

25. The apparatus of claim 23, wherein the gasses are introduced into the chamber at each end of the plurality of rows of filter elements.

26. The apparatus of claim 25 wherein the first and second pulses have differing pressures and durations.

27. The apparatus of claim 25 further comprising a plurality of baffles disposed at each end of the plurality of rows of filter elements for causing the gas introduced into the chamber to be directed toward the grounded plates and electrodes.

28. The apparatus of claim 22 further comprising a plurality of air nozzles disposed above each filter element to clean the elements by directing a burst of air inside the elements.

29. The apparatus of claim 28 wherein the air directed inside the elements is pulsed with sufficient pulse energy and volume to propel particulates past the plurality of high voltage electrodes where the particulates can be trapped on the plurality of grounded plates.

30. The apparatus of claim 29 wherein the elements are cleaned by directing first and second pulses inside the elements.

31. The apparatus of claim 22 wherein the at least one grounded plate comprises a plurality of grounded plates disposed generally parallel to each other, wherein the grounded plates channel the bursts of air downward.

32. The apparatus of claim 22 further comprising at least one grounded grid disposed between the at least one filter element and one of the at least one high voltage electrode.

33. The apparatus of claim 22 further comprising:
a hopper disposed below the electrostatic precipitation zone; and
wherein dust is collected on the grounded plate, and is removed from the grounded plate by rapping the grounded plate.

34. The apparatus of claim 22, wherein the distance from the at least one filter element to the adjacent high voltage electrode is from 51% to 80% of the total distance from the filter element to the adjacent grounded plate.

35. The apparatus of claim 22 wherein the distance from the grounded plate to the at least one filter element adjacent is in the range of 4 inches to 25 inches.

36. The apparatus of claim 22 wherein the flow of gasses through the chamber flows at a filtration velocity in the range of 8 feet per minute to 24 feet per minute.

37. The apparatus of claim 22 wherein the electrostatic precipitation zone extends horizontally past the at least one filter element.

38. The apparatus of claim 22 wherein the electrostatic precipitation zone extends vertically past the at least one filter element.

39. The apparatus of claim 22 further comprising an insulator disposed between the at least one high voltage electrode and the at least one filter element to insulate the high voltage electrode from the at least one filter element.

40. The apparatus of claim 22 wherein the high voltage electrode is comprised of a directional electrode which forces any sparking to occur between the high voltage electrode and the grounded plate rather than between the high voltage electrode and the at least one filter element.

41. The apparatus of claim 22 wherein the at least one filter element is comprised of fabric in a cylindrical bag configuration.

42. The apparatus of claim 41 wherein the fabric is comprised of expanded polytetrafluoroethylene membrane filter media.

43. The apparatus of claim 42 wherein the fabric is conductive.

44. The apparatus of claim 22 wherein the at least one filter element is comprised of a conductive filter media.

45. The apparatus of claim 44 wherein the filter media is comprised of porous sintered metal.

46. The apparatus of claim 22 wherein the at least one filter element is comprised of pleated cartridges.

47. The apparatus of claim 46 wherein the pleated cartridges are comprised of nonwoven polyester.

48. The apparatus of claim 22 wherein the at least one filter element is comprised of a rigid porous ceramic material.

49. The apparatus of claim 22 wherein the at least one filter element is comprised of ceramic gas filters.

50. A filtration and electrostatic precipitation device for the collection of particulates comprising:

a housing having inlet ducting to introduce dirty gas to the device and outlet ducting to pass cleaned gas out of the device;

a plurality of rows of filter elements disposed within the housing, the filter elements being in communication with the outlet ducting of the device;

a plurality of grounded collection plates disposed generally parallel to the rows of filter elements so that each row of filter elements is separated from adjacent rows of filter elements by at least one of the grounded collection plates; and a plurality of high voltage electrode grids disposed between and separated from the rows of filter elements and the plurality of grounded collection plates to form a plurality of electrostatic collection areas within the housing.

51. A method of controlling articulate gas pollutants in a gaseous medium comprising the steps of:

providing a housing having inlet ducting to introduce dirty gas into the housing and outlet ducting to pass cleaned gas out of the housing;

providing a plurality of rows of filter elements disposed within the housing, the filter elements being in communication with the outlet ducting of the housing;

providing a plurality of grounded collection plates disposed generally parallel to the rows of filter elements so that each row of filter elements is separated from adjacent rows of filter elements by at least one of the grounded collection plates;

providing a plurality of electrodes disposed between and separated from the rows of filter elements and the plurality of grounded collection plates;

applying a voltage to the electrode grids to form a plurality of electrostatic collection areas between the electrodes and the grounded collection plates;

directing gas into the housing in the proximity of the electrostatic collection areas; and filtering the gas by forcing the gas through the plurality of rows of filter elements and through the outlet ducting of the housing.

52. The method of claim 51 wherein 50 to 99% of the particulates in the gas are collected in the electrostatic collection areas.

53. The method of claim 51 further comprising the step of injecting an amount of ammonia gas and sulfur trioxide gas into the gas directed into the housing.

54. The method of claim 51 further comprising the step of baffling the gas directed into the housing to induce laminar flow.

* * * * *